US006813732B2

United States Patent
Kurooka et al.

(10) Patent No.: US 6,813,732 B2
(45) Date of Patent: Nov. 2, 2004

(54) TRACE CIRCUIT (75) Inventors: Kazuaki Kurooka, Tokyo (JP);
Teruaki Kanzaki, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 540 days.

(21) Appl. No.: 09/920,930

(22) Filed: Aug. 3, 2001

(65) Prior Publication Data
US 2002/0162055 A1 Oct. 31, 2002

(30) Foreign Application Priority Data
Apr. 25, 2001 (JP) ........................................ 2001-128285

(51) Int. Cl.[7] .............................................. G06F 11/00
(52) U.S. Cl. ........................................ 714/45; 703/28
(58) Field of Search ........................... 714/45, 28, 29; 703/28; 710/53, 60, 61; 711/157, 167

(56) References Cited

U.S. PATENT DOCUMENTS 6,055,651 A * 4/2000 Sasaki et al. .................. 714/45
6,233,673 B1 * 5/2001 Higashida ..................... 712/227
6,243,834 B1 * 6/2001 Garrett ......................... 714/37
6,393,587 B2 * 5/2002 Bucher et al. ................. 714/39
2002/0010882 A1 * 1/2002 Yamashita ..................... 714/45
2002/0120815 A1 * 8/2002 Zahavi et al. ................ 711/118

FOREIGN PATENT DOCUMENTS

| JP | 06052013 A | * 2/1994 | .......... G06F/11/28 |
| JP | 7-121402 A | 5/1995 | |
| JP | 9-261226 A | 10/1997 | |

* cited by examiner

Primary Examiner—Scott Baderman
(74) Attorney, Agent, or Firm—Leydig, Voit & Mayer, Ltd.

(57) ABSTRACT

A trace circuit includes the event control circuit and two trace buffer memories. The event control circuit receives data on a control bus, an address bus, and data a bus and stores the data cyclically and alternately in the two buffer memories. Also, the event control circuit makes the two buffer memories output the stored data cyclically and alternately.

8 Claims, 7 Drawing Sheets

TRACE CIRCUIT

FIELD OF THE INVENTION

This invention relates to a trace circuit built into a debugging circuit which is, in turn, built into a microcomputer of a device.

BACKGROUND OF THE INVENTION

Conventionally, it is common to use an in-circuit emulator (ICE) for debugging programs of a microcomputer. The ICE emulates a function of a microcomputer for program debugging. Address bus, data bus and control bus of the microcomputer are connected to the memory of the ICE. A program is downloaded, in the memory of the ICE, from the host computer that controls the ICE. The ICE, based on the downloaded program, operates the microcomputer.

The microcomputer of the ICE is replaced by a microcomputer which is the object of program debugging. Thereafter the program debugging is performed.

In a general microcomputer-embedded-typed LSI, the address bus and data bus and so on for connecting to the memory of the ICE are not connected to the LSI terminal. This is because the program is stored in a memory embedded in the microcomputer. Therefore, a mode only used for ICE connection is prepared. An address bus and a data bus are extended from the external terminal of the LSI. In addition, the original function, with the terminal used as an address bus and a data bus, is carried out within the ICE.

However, because several terminals of the microcomputer need to be connected between the ICE and the target system, the connection between ICE and the target system has become difficult, accompanying an improvement in speed of a microcomputer or a multi-bit bus. Furthermore, the various functions for system realization, other than a microcomputer, are embedded in LSI in system LSI in which a microcomputer is embedded, so that it has become difficult to emulate the original function which the terminal used as an address bus or a data bus for connection with the memory of ICE has, using the ICE.

The debugging circuit performing the function, which the ICE conventionally has on the basis of the foregoing description, is embedded in a microcomputer, and a program development technique has been adopted such that the emulator (debugger) is connected to a host computer through an LSI terminal only for debugging.

Figure 6:
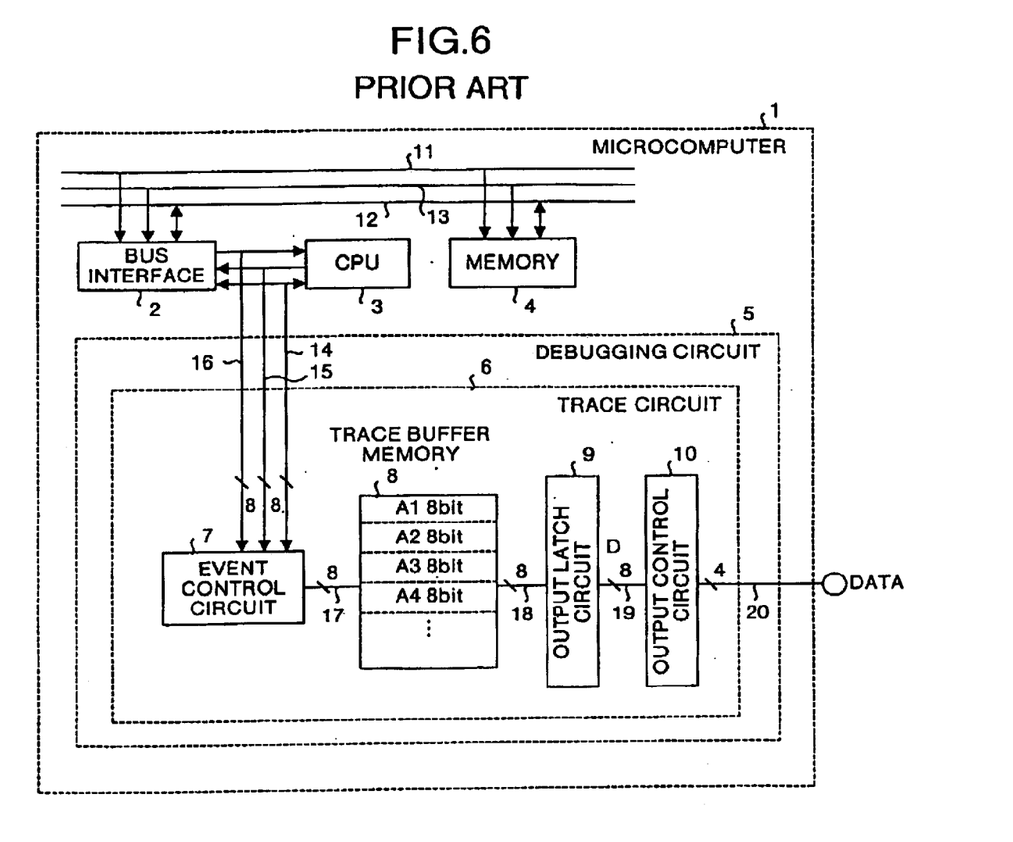
FIG. 6 is a block diagram showing the composition of the conventional circuit.

FIG. 6 shows an internal circuit arrangement of the conventional microcomputer-embedded LSI 1. Reference numeral 2 denotes a bus interface. Reference numeral 3 denotes a CPU. Reference numeral 4 denotes a memory. Reference numeral 5 denotes a debugging circuit Reference numeral 6 denotes a trace circuit in the debugging circuit. Reference numeral 7 denotes a control circuit (event control circuit). Reference numeral 8 denotes a trace buffer memory. Reference numeral 9 denotes an output latching circuit. Reference numeral 10 denotes an output control circuit Reference numeral 11 denotes a control bus. Reference numeral 12 denotes an address bus. Reference numeral 13 denotes a data bus. Reference numeral 14 denotes a control bus. Reference numeral 15 denotes an address bus. Reference numeral 16 denotes a data bus. Reference numerals 14, 15 and 16 denote trace buses. Data is output from the trace circuit 6 through the LSI data output terminal DATA. This data is constituted by 4 bits.

Figure 7:
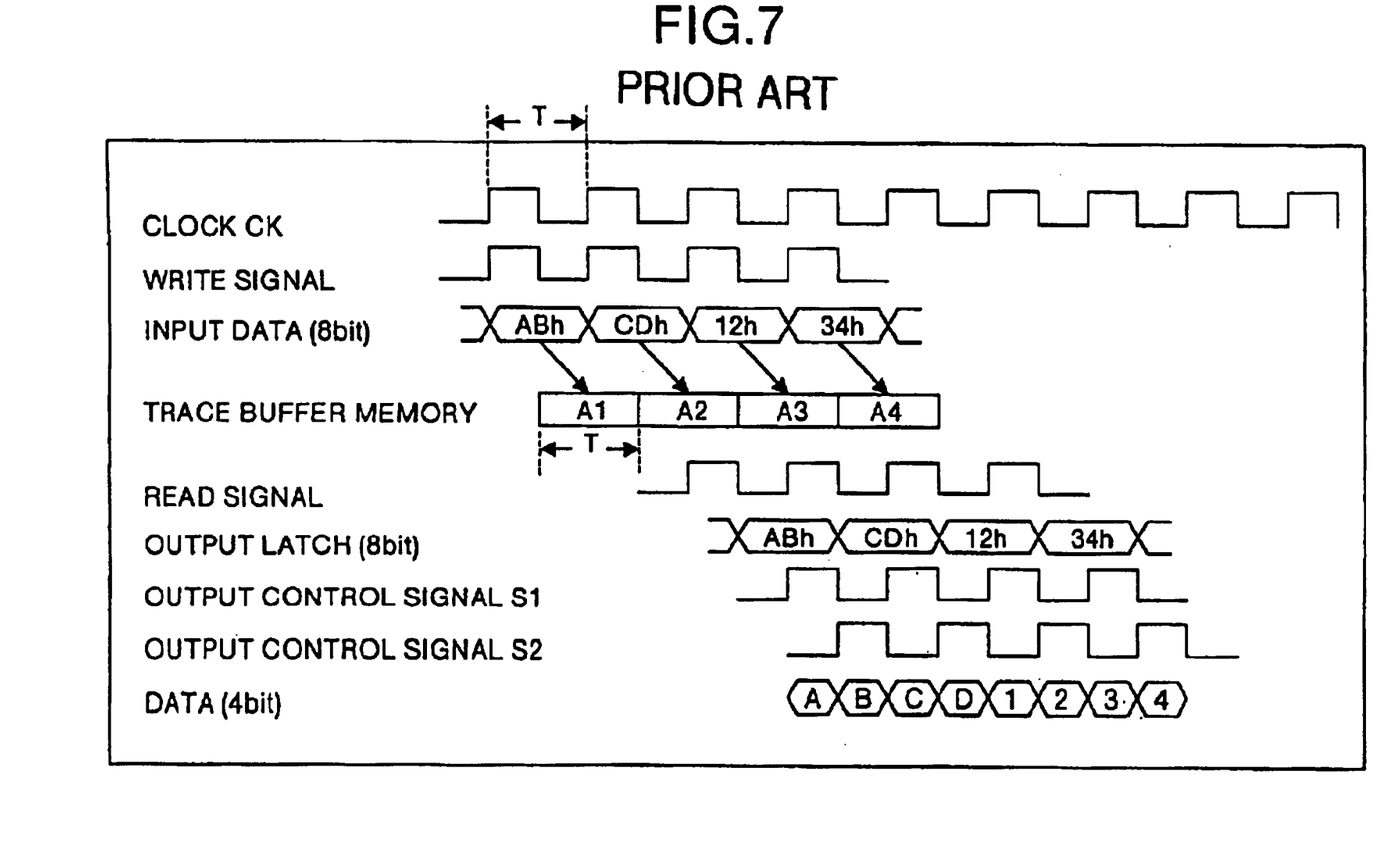
FIG. 7 shows time charts of various signals for explaining operation of the conventional circuit.

FIG. 7 shows a timing chart of various signals in this trace circuit 6. Any desired data (8 bits) of the control bus 14, the address bus 15, and the data bus 16 is stored in the trace buffer memory 8 through the event control circuit 7 based on a signal WRITE that is synchronized with the bus clock signal CK. The data once D stored in the trace buffer memory 8 is output, based on subsequent READ signals, from the trace buffer memory 8 to the output latch circuit 9 and is further input into the output control circuit 10. The output control circuit 10 converts 8-bit data to 4-bit data, which is output through the terminal DATA, using the output control signals S1 and S2, each of whose frequency is the same as the bus clock signal CK frequency and whose phase is shifted by only $\pi$ through the terminal DATA. In FIG. 7, ABh, CDh, 12h, 34h are hexadecimal numbers. Furthermore, in FIG. 6 and FIG. 7, A1, A2, A3, and A4 are 8-bit data stored in sequence in the trace buffer memory 8.

However, the processing speed of the microcomputer in the system LSI in recent years is becoming faster and the bus clock frequency therein is increasing. As a result, in the conventional case, access speed to a trace buffer memory cannot catch up with the speed at which data is transmitted from the control circuit. In other words, since one bus cycle is becoming shorter and shorter, it is becoming difficult to store the input data in the trace buffer memory or to output the data from it during one bus cycle.

SUMMARY OF THE INVENTION

It is an object of the present invention to obtain a trace circuit capable of surely transferring data to an emulator through a trace buffer memory, even if a bus clock frequency is accelerated.

The trace circuit according to the present invention comprises plural trace buffer memories in which the data on the bus of the microcomputer is stored according to the bus clock signal; a control circuit which makes the trace buffer memories store cyclically and in a predetermined order the data on the bus, makes the trace buffer memories output cyclically and in a predetermined order the stored data, wherein the storage of data in and output of data from the trace buffer memories is performed in synchronization with the bus clock signal; and an output terminal through which the data stored in the trace buffer memories is output to the emulator.

Other objects and features of this invention will become apparent from the following description with reference to the accompanying drawings.

DESCRIPTION OF THE PREFERRED EMBODIMENTS

Embodiments of the trace circuit of the present invention will be described in detail below with reference to the accompanying drawings. However, this invention is not limited only to these embodiments.

Figure 1:
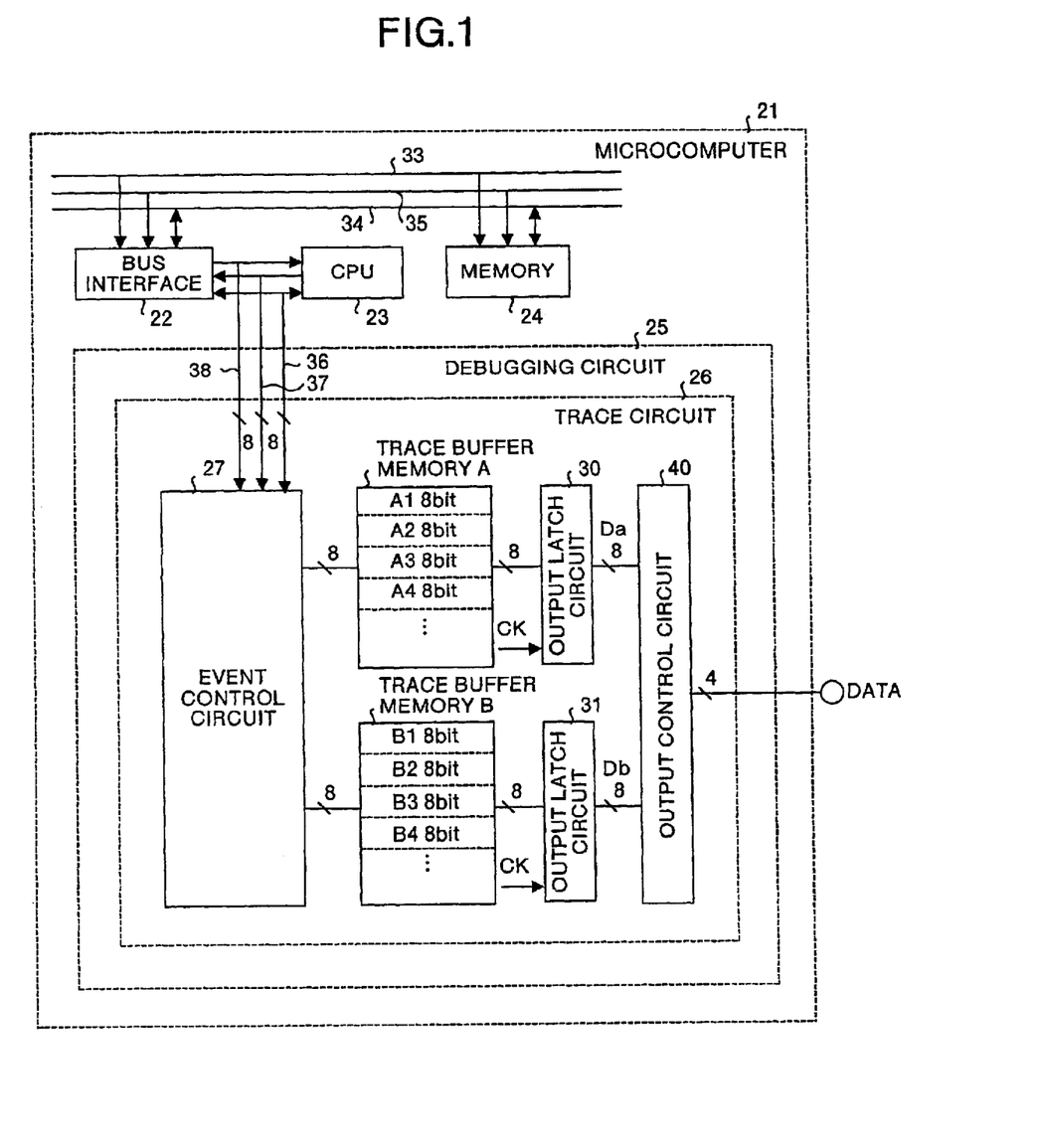
FIG. 1 is a block diagram showing the composition of a first embodiment of this invention.

FIG. 1 shows a block diagram representing a microcomputer of LSI with an embedded debugging circuit according to the first embodiment of this invention. The trace circuit is embedded in the debugging circuit.

Reference numeral 21 denotes a microcomputer (LSI) Reference numeral 25 denotes a debugging circuit embedded in the microcomputer 21. Reference numeral 26 is a trace circuit that traces data on the bus of the microcomputer 21. The trace circuit 26 is provided with plural bits (4 bits in this case) DATA terminal which inputs and outputs data to an external debugger. Reference numeral 22 denotes a bus interface. Reference numeral 23 denotes CPU. Reference numeral 24 denotes a memory. Reference numeral 33 denotes a control bus. Reference numeral 34 denotes an address bus. Reference numeral 35 denotes a data bus. Reference numerals 36, 37, and 38 denote buses used for tracing, of which 36 denotes control bus, 37 denotes address bus, and 38 denotes 8 bit data bus. In the control bus 36 passes the write-in signal WRITE, read-out signal READ, and bus clock signal CK. The external debugger is connected to the host computer.

The internal arrangement of the trace circuit 26 will be explained now. The trace circuit 26 has the event control circuit 27, two trace buffer memories A and B, two output latch circuits 30 and 31, and the output control circuit 40. The event control circuit 27, trace buffer memories A and B, output latch circuits 30 and 31, and the output control circuit 40 operate in synchronization with the clock signal CK synchronized with the bus cycle of a trace origin bus.

If a trace event occurs, the event control circuit 27 obtains trace data from any of the control bus 36 for trace, the address bus 37, and the data bus 38. The trace data which have been obtained are input-and-output control to the trace buffer memories A and B using the signal WRITE and the signal READ obtained from the control bus 36. The signal WRITE and the signal READ are signals of the same frequency as a frequency synchronized with the bus clock signal CK.

The trace circuit 26 is provided with two trace buffer memories A and B which are reading/writing controlled with the signal WRITE and the signal READ. Input and output of the trace buffer memories A and B are 8 bits, respectively.

The event control circuit 27 stores trace data in these two trace buffer memories A and B alternatively when the input 8-bit trace data from many of the control bus 36, address bus 37, and data bus 38 is stored in two trace buffer memories A and B.

The output latch circuit 30 is constituted by latch circuits for 8 bits, and latches the trace data read from the trace buffer memory A using the signal READ as a trigger. The output latch circuit 31 is constituted by latch circuits for 8 bits, and latches the trace data read from the trace buffer memory B using the signal READ used as a trigger. The outputs of these output latch circuits 30 and 31 are input into the output control circuit 40.

The output control circuit 40 performs bit width conversion processing in which the 8-bit output Da of the output latch circuit 30 and the 8-bit output Db of the output latch circuit 31 are converted into 4-bit bit width data, using the output control signals Sa1, Sa2, Sb1, and Sb2 whose phase is shifted by $\pi$ radian and which have period 2T that is twice the period of the clock signal CK. The trace data changed into 4 bits is output to an external debugger through terminal DATA.

Figure 2:
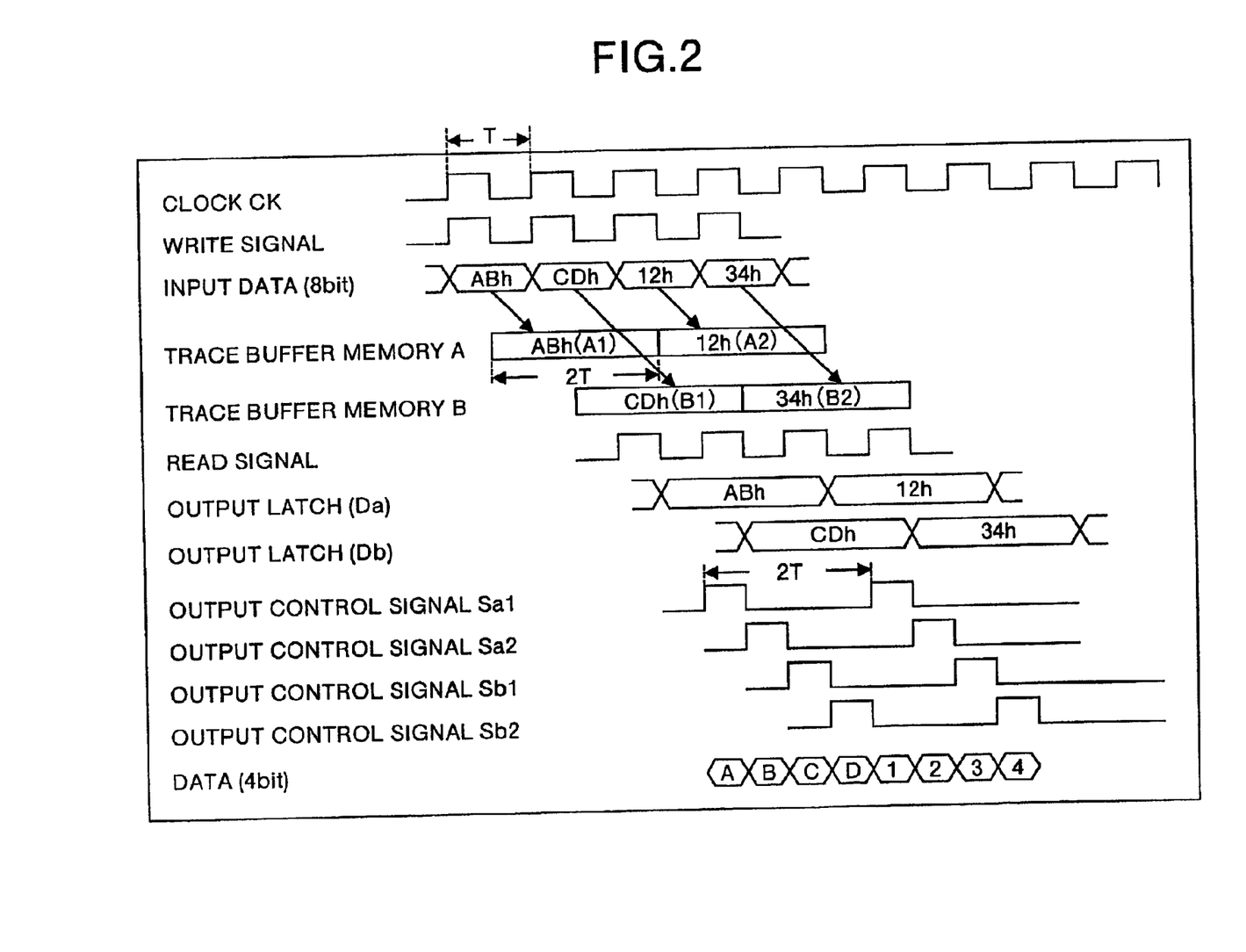
FIG. 2 shows time charts of various signals for explaining operation of the first embodiment.

Operation of the trace circuit 26 will now be explained with reference to the time charts shown in FIG. 2. The event control circuit 27 stores the trace data (8 bits, and ABh is a hexadecimal number) of the first bus cycle obtained from any of the control bus 36, the address bus 37, and the data bus 38 into the trace buffer memory A based on the signal WRITE that is synchronized with the clock signal CK.

During the following bus cycle, the event control circuit 27 stores the trace data (CDh) obtained from any of the control bus 36, the address bus 37, and the data bus 38 into the trace buffer memory B based on the signal WRITE.

During the following bus cycle, the event control circuit 27 stores the trace data (12h) obtained from any of the control bus 36, the address bus 37, or the data bus 38 into the trace buffer memory A based on the signal WRITE.

During the following bus cycle, the event control circuit 27 stores the trace data (34h) obtained from any of the control bus 36, the address bus 37, and the data bus 38 into the trace buffer memory B based on the signal WRITE.

Thus, the trace data are written in the trace buffer memories A and B alternatively. Therefore, it is sufficient that the data is stored into any trace buffer memory within a time which is equal to two bus-cycle 2T.

During a certain bus cycle, the event control circuit 27 orchestrates the trace buffer memory A to output the data A1 (ABh), based on the signal READ that is synchronized with the clock signal CK, to the output latch circuit 30. The output latch circuit 30 latches the data received from the trace buffer memory A based on the signal READ as a trigger.

During the following bus cycle, the event control circuit 27 orchestrates the trace buffer memory B to output the data B1 (CDh), based on the signal READ, to the output latch circuit 31. The output latch circuit 31 latches the data received from the trace buffer memory B based on the signal READ as a trigger.

During the following bus cycle, the event control circuit 27 orchestrates the trace buffer memory A to output the data A2 (12h), based on the signal READ, to the latch circuit 30. The output latch circuit 30 latches the data read from the trace buffer memory A based on the signal READ as a trigger.

During the following bus cycle, the event control circuit 27 orchestrates the trace buffer memory B to output the data B2 (34h), based on the signal READ, to the output latch circuit 31. The output latch circuit 31 latches the data read from the trace buffer memory B based on the signal READ as a trigger.

Thus, trace data is read from two trace buffer memories A and B alternatively. Therefore, it is sufficient that the data is read out from any trace buffer memory within a time which is equal to two bus-cycle 2T.

The output control circuit 40 carries out bit width conversion of the 8-bit output Da of the output latch circuit 30 at a 4-bit output using the output control signals Sa1 and Sa2 whose phases are shifted by every $\pi$ radian and which have a period 2T that is twice the period of the clock signal CK. For example, when 8-bit data (ABh) is input from the output latch circuit 30, the output control circuit 40 converts this 8-bit data into 4-bit data (Ah) and (Bh).

Furthermore, the output control circuit 40 carries out bit width conversion of the 8-bit output Db of the output latch circuit 31 at a 4-bit output using the output control signals Sb1 and Sb2 whose phases are shifted by every $\pi$ radian and which have a period 2T that is twice the period of the clock signal CK. For example, when8-bit data (CDh) is input from the output latch circuit 31, the output control circuit 40 converts this 8-bit data into 4-bit data (Ch) and (Dh) The trace data converted to 4-bit width by the output control circuit 40 are output by every 4-bit to the terminal DATA.

Thus, the trace data output from the terminal DATA is the same as that in the conventional art explained with reference to FIG. 6 and FIG. 7. In the conventional case there is only one trace buffer memory and storage and output of data are performed within one bus cycle T. However, in the first embodiment, as shown in FIG. 2, the trace data is held in each of the trace buffer memories A and B and the output latch circuits 30 and 31 for two bus-cycles 2T which is twice as compared with the conventional case. Thus, there is enough time in accessing the trace buffer memory even if the bus cycle T becomes faster and the data transfer speed is increased. Therefore, it becomes possible to surely output data to a trace destination, without being late for the data transfer speed of a trace origin.

The second embodiment of this invention will now be explained. According to the second embodiment, the event control circuit 27 judges the number of bits (bit width) of the trace data to be traced, and when the bit width is shorter than a predetermined bit width the event control circuit 27 stores data in only one of the two trace buffer memories A and B, and data from that trace buffer memory is output.

That is, it is not necessary to alternatively change the buffer memories A and B of a storing destination according to not the order of A1-B1-A2-B2 as stated in the first embodiment but the order of A1–A2–A3–A4 regarding as order of storage of a trace buffer memory when a number of bits of the data transferred from any of the control bus 36, the trace circuit 26, the address bus 37, and the data bus 38 is smaller than 8 bits and when data transmission can be performed during the one bus cycle T.

The signal indicating the bit length of the data sent through the data bus 38 or address bus 37 is sent to the event control circuit 27 through the control bus 36. Alternatively, 1 bit in a data bus 38 or the data of an address bus 37 is made into a coding bit, and there is a method of making discriminate using this coding bit two kinds of whether a bit length is long or short in the judgment of bit length.

Figure 3:
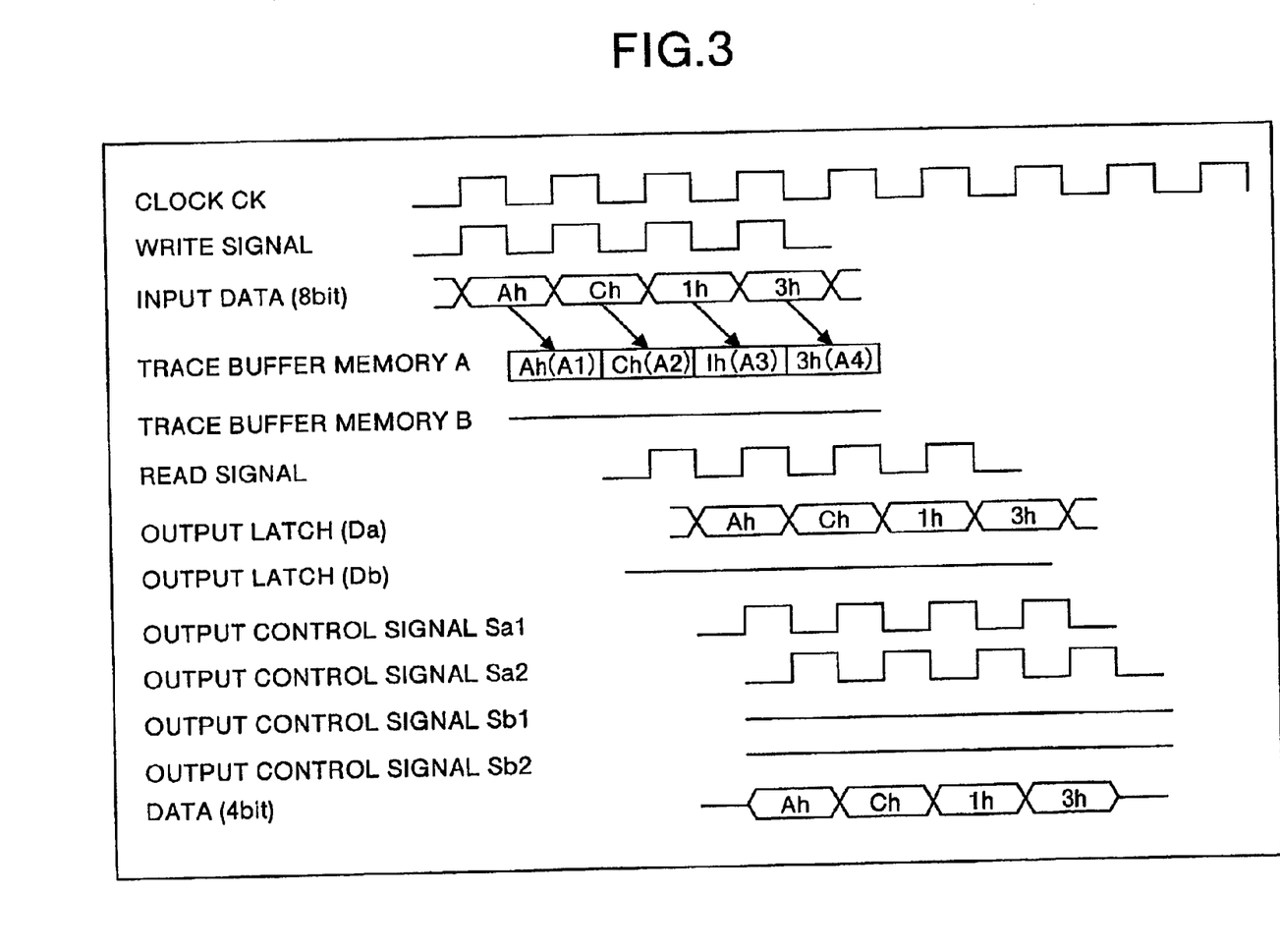
FIG. 3 shows time charts of various signals for explaining operation of the second embodiment of this invention.

FIG. 3 shows a timing chart of the various signals in the trace circuit 26 according to the second embodiment. Width of the data to be stored in the trace buffer memories A or B is 4 bits (Ah, Bh, 1h, 3h) The control circuit 27 stores the trace data of 4-bit only in the trace buffer memory A based on the signal WRITE that is synchronized with the clock signal CK. The output latch circuit 30 only reads the data stored in the trace buffer memory A, based on the signal READ, and latches the data. The output control circuit 40 outputs the 4-bit trace data output from the output latch circuit 30 to the terminal DATA as 4-bit trace data using the output control signals Sa1 and Sa2 of the same frequency as a bus clock signal frequency.

According to the second embodiment, when the bit width of the trace data is shorter than the predetermined bit width, i.e. the data is such that it can be transferred during one bus cycle, only one trace buffer memory is used. Thus, since changing of the trace buffer memory for storage of data is not performed, data can be output at higher speed.

Figure 4:
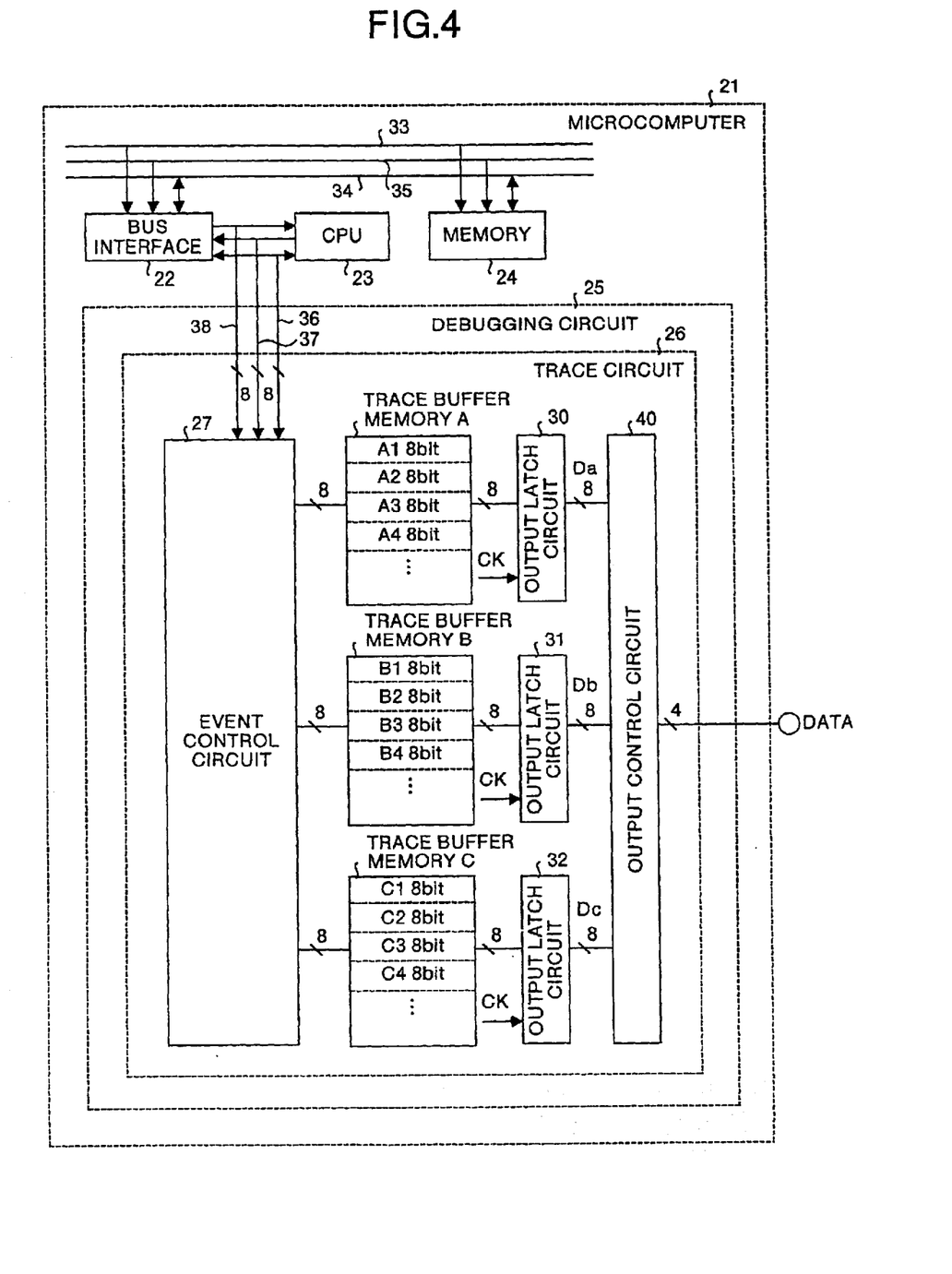
FIG. 4 is a block diagram showing the composition of a third embodiment of this invention.

The third embodiment of this invention will now be explained using FIG. 4 and FIG. 5. In the third embodiment, three or more trace buffer memories are provided. As a result, it becomes possible to cope with a still shorter bus cycle. In FIG. 4, sections that have same or similar structure or function as the sections shown in FIG. 1 are attached with the same legends, and to avoid repetition of explanation, their explanation will be omitted.

The trace circuit 26 has the event control circuit 27, three trace buffer memories A, B, and C, three output latch circuits 30, 31, and 32, and the output control circuit 40.

Operation of the trace circuit 26 will be explained with reference to the time charts shown in FIG. 5.

The event control circuit 27 stores the 8-bit trace data (ABh) of the first bus cycle obtained from any of the control bus 36, address bus 37, and data bus 38 in a trace buffer memory A based on the signal WRITE that is synchronized with the clock signal CK.

During the following bus cycle, the event control circuit 27 stores the trace data (CDh) obtained from any of the control bus 36, the address bus 37, and the data bus 38 in the trace buffer memory B based on the signal WRITE.

During the following bus cycle, the event control circuit 27 stores the trace data (12h) obtained from any of the control bus 36, the address bus 37, and the data bus 38 in the trace buffer memory C based on the signal WRITE.

During the following bus cycle, the event control circuit 27 stores the trace data (34h) obtained from any of the control bus 36, the address bus 37, and the data bus 38 in the trace buffer memory A based on the signal WRITE. In FIG. 4 and FIG. 5, A1, A2, . . . ; B1, B2, . . . ; and C1, C2, . . . are 8-bit data stored in sequence in the trace buffer memories A, B, and C respectively.

Thus, the trace data is cyclically written in three trace buffer memories A, B, and C in a predetermined order (which is A-B-C-A-B . . . in this case). Therefore, it is sufficient that the data is stored into any trace buffer memory within a time which is equal to three bus-cycle 3T.

In a certain bus cycle, the event control circuit 27 orchestrates the trace buffer memory A to output the data (ABh), based on the signal READ that is synchronized with the bus clock signal CK, to the output latch circuit 30. The output latch circuit 30 latches the data received from the trace buffer memory A based on the signal READ as a trigger.

During the following bus cycle, the event control circuit 27 orchestrates the trace buffer memory B to output the data (CDh), based on the signal READ, to the output latch circuit 31. The output latch circuit 31 latches the data received from the trace buffer memory B based on the signal READ as a trigger.

During the following bus cycle, the event control circuit 27 orchestrates the trace buffer memory C to output the data (12h), based on the signal READ, to the output latch circuit 32. The output latch circuit 32 latches the data received from the trace buffer memory C based on the signal READ as a trigger.

During the following bus cycle, the event control circuit 27 orchestrates the trace buffer memory A to output the data (34h), based on the signal READ, to the output latch circuit 30. The output latch circuit 30 latches the data received from the trace buffer memory A based on the signal READ as a trigger.

Thus, trace data are cyclically read from three trace buffer memories A, B, and C in a predetermined order. Therefore, it is sufficient that the data is stored into any trace buffer memory within a time which is equal to three bus-cycle 3T.

The output control circuit 40 converts bit width of the 8-bit output Da of the output latch circuit 30 to 4-bit output using the output control signals Sa1 and Sa2 whose phase is shifted by $\pi$ radian and which have period 3T that is thrice the period of the clock signal CK. Further, the output control circuit 40 converts bit width of the 8-bit output Db of the output latch circuit 31 to 4-bit output using the output control signals Sb1 and Sb2 whose phase is shifted by $\pi$ radian and which have period 3T that is thrice the period of the clock signal CK. Moreover, the output control circuit 40 converts bit width of the 8-bit output Dc of the output latch circuit 32 to 4-bit output using the output control signals Sc1 and Sc2 whose phase is shifted by $\pi$ radian and which have period 3T that is thrice the period of the clock signal CK. The output control circuit 40 outputs 4 bits of trace data each time to the terminal DATA.

Figure 5:
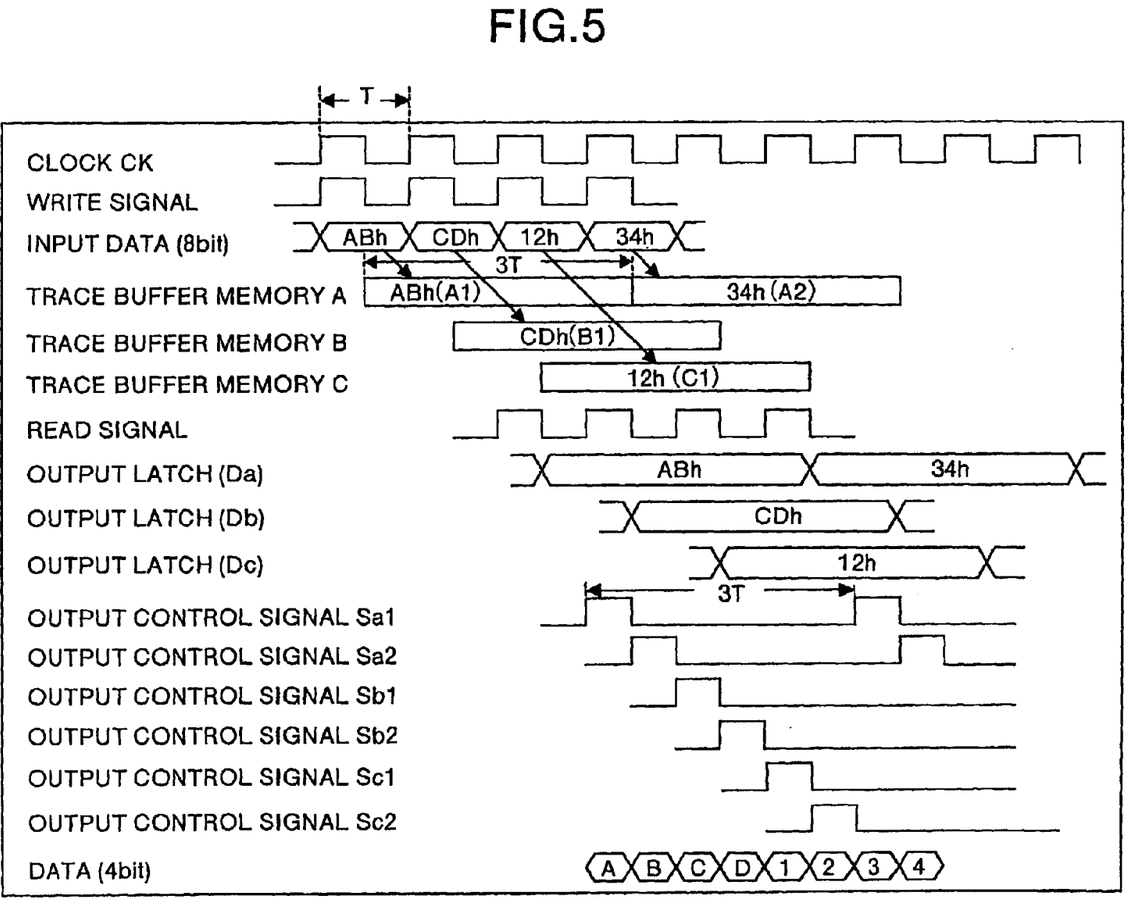
FIG. 5 shows time charts of various signals for explaining operation of the third embodiment.

In the third embodiment, as shown in FIG. 5, the trace data is held in each of the trace buffer memories A, B and C and the output latch circuits 30, 31, and 32 for three bus-cycles 3T which is thrice as compared with the conventional case. Thus, there is enough time in accessing the trace buffer memory even if the bus cycle T becomes faster and the data transfer speed is increased. Therefore, it becomes possible to surely output data to a trace destination, without being late for the data transfer speed of a trace origin.

In addition, the second embodiment and the third embodiments may be combined. That is, if the bit width of the data on the buses 36, 37 and 38 is shorter than a predetermined number, then the data within one bus cycle is transferred only to one of the three trace buffer memories. Furthermore, the third embodiment explains a case in which the trace circuit includes three trace buffer memories and three output latch circuits, however, more than three trace buffer memories and three output latch circuits may be provided.

Furthermore, it has been explained above that the output control circuit 40 performs bit width conversion, i.e. 8-bit to 4-bit. However, bit width conversion may be omitted and the output control circuit 40 may not be provided, if the data is supplied to a terminal or an external debugger that can take 8-bit data.

As explained above, according to the trace circuit relating to this invention, plural trace buffer memories are prepared, the data on the buses are cyclically stored in a predetermined order in these trace buffer memories, and the data is cyclically output in predetermined order from these trace buffer memories. Therefore, the trace data for debugging can be certainly transferred to an external debugger, without being late for the data transmission speed of a trace original, even if bus clock frequency is accelerated or bus bit width becomes large.

Furthermore, the bit width of the data on the busses is checked, and if the bit width is shorter than a predetermined number, the data are stored only in some of the trace buffer memories and the data is cyclically output in a predetermined order from those trace buffer memories. Thereby the time for alternatively changing over the trace buffer memories of a storing destination place is reduced and storage and output of data can be performed at high speed.

Furthermore, the trace data for debugging can be surely transferred to an external debugger, without being late for the data transmission speed of a trace origin, even if bus clock frequency is increased or the bus bit width is made larger, because it is made to alternatively output data from two trace buffer memories, while alternatively storing the data on a bus to two trace buffer memories.

Furthermore, bit width of the data from the output latch circuits is converted to the bit width acceptable to the emulator. Therefore, the circuit may be made to adopt to any type of emulator.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A trace circuit built into a debugging circuit that is, in turn, built into a microcomputer for program debugging, said trace circuit tracing data on a bus of the microcomputer according to a bus clock signal and outputting a result to an emulator, said trace circuit comprising:

a plurality of trace butter memories in which the data on the bus of the microcomputer is stored according to the bus clock signal;

a control circuit storing the data on the bus in said trace buffer memories, cyclically and in a predetermined order, outputting the data stored in said trace buffer memories, cyclically and in a predetermined order, wherein the storage of data in and output of data from said trace buffer memories is synchronized with the bus clock signal, and said control circuit checks the number of bits of the data on said bus, and, if the number of bits of the data on said bus is no larger than a predetermined value, said control circuit stores the data on the bus in only some of said trace buffer memories, and outputs the data stored in said trace buffer memories, cyclically and in predetermined order; and an output terminal through which the data stored in said trace buffer memories is output to the emulator.

2. The trace circuit according to claim 1 wherein the predetermined value is 4 bits.

3. The trace circuit according to claim 1 further comprising a bit width conversion circuit connected between said trace buffer memories and said output terminal, wherein said bit width conversion circuit changes bit width of the data to be output from said output terminal based on bit width of the emulator.

4. The trace circuit according to claim 3 further comprising output latch circuits in a number equal to the number of said trace buffer memories and connected between respective trace buffer memories and said bit width conversion circuit, wherein said output latch circuits latch outputs of said trace buffer memories.

5. A trace circuit built into a debugging circuit that is, in turn, built into a microcomputer for program debugging, said trace circuit tracing data on a bus of the microcomputer according to a bus clock signal and outputting a result to an emulator, said trace circuit comprising:

two trace buffer memories in which the data on the bus of the microcomputer is stored according to the bus clock signal;

a control circuit storing the data on the bus in said trace buffer memories cyclically and alternately, outputting the data stored from said trace buffer memories cyclically and alternately, wherein the storage of data in and output of data from said trace buffer memories is synchronized with the bus clock signal, and said control circuit checks the number of bits of the data on the bus, and, if the number of bits of the data on the bus is no larger than a predetermined value, said control circuit stores the data on the bus in only one of said trace buffer memories, and outputs the data stored in said trace buffer memories, cyclically and in a predetermined order; and an output terminal through which the data stored in said trace buffer memories is output to the emulator.

6. The trace circuit according to claim 5, wherein the predetermined value is 4 bits.

7. The trace circuit according to claim 5 further comprising a bit width conversion circuit connected between said trace buffer memories and said output terminal, wherein said bit width conversion circuit changes bit width of the data to be output from said output terminal based on bit width of the emulator.

8. The trace circuit according to claim 7 further comprising two output latch circuits respectively connected between said two trace buffer memories and said bit width conversion circuit, wherein said output latch circuits latch outputs of said trace buffer memories.

* * * * *